(12) United States Patent
Langgood et al.

(10) Patent No.: US 7,545,370 B1
(45) Date of Patent: Jun. 9, 2009

(54) AUTOMATIC CLEANING OF USEABLE SURFACES OF A PORTABLE COMPUTER DEVICE

(75) Inventors: John K. Langgood, Cary, NC (US); Thomas F. Lewis, Raleigh, NC (US); Kevin M. Reinberg, Chapel Hill, NC (US); Kevin S. D. Vernon, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 12/181,936

(22) Filed: Jul. 29, 2008

(51) Int. Cl.
*G06F 3/02* (2006.01)
*G06F 1/16* (2006.01)
*G06F 3/038* (2006.01)

(52) U.S. Cl. .................. 345/204; 345/168; 361/681

(58) Field of Classification Search ............. 345/204, 345/156, 168, 169, 901, 905; 361/681; 348/794
See application file for complete search history.

(56) References Cited

U.S. PATENT DOCUMENTS

| 5,550,564 | A | 8/1996 | Cragun |
| 6,940,418 | B2 * | 9/2005 | Blum et al. ............... 340/815.4 |
| 6,946,170 | B2 | 9/2005 | Gerber et al. |
| 2006/0232912 | A1 * | 10/2006 | Lin et al. ..................... 361/600 |
| 2007/0287515 | A1 | 12/2007 | Fagrenius et al. |
| 2008/0048971 | A1 | 2/2008 | Beckhusen et al. |

FOREIGN PATENT DOCUMENTS

| JP | 08-016116 | * | 1/1996 |
| JP | 10-174022 | * | 6/1998 |

* cited by examiner

*Primary Examiner*—Jimmy H Nguyen
(74) *Attorney, Agent, or Firm*—Suiter Swantz pc llo

(57) ABSTRACT

An apparatus for automatic cleaning of a portable computing device, comprises at least one display surface of a portable device, a housing in the portable computing device adjacent to the display surface, an enclosed cavity located in the housing, a cleaning device located in the enclosed cavity, a mechanism for moving the cleaning device during cleaning, and a controller to initiate the cleaning.

1 Claim, 4 Drawing Sheets

AUTOMATIC CLEANING OF USEABLE SURFACES OF A PORTABLE COMPUTER DEVICE

TECHNICAL FIELD

The present disclosure generally relates to the field of computer engineering, and more particularly to an automatic cleaning apparatus installed on a portable computing device.

BACKGROUND

On a portable computing device having a visual display and keyboard, the display and keyboard become dusty or dirty after use and may require cleaning. Current cleaning methods involve manual human action and require the use of employee time and external cleaning tools to properly clean the surfaces of the device.

SUMMARY

An apparatus for automatic cleaning of a surface of a portable computing device includes, but is not limited to, a housing in a portable computing device adjacent to at least one surface of said portable computing device, an enclosed cavity located in said housing, a cleaning device located in said enclosed cavity, a mechanism for moving said cleaning device during cleaning, and a controller to initiate cleaning.

A method for cleaning a surface of a portable computing device includes, but is not limited to, forming a cavity within a housing of the portable computing device; inserting a cleaning device within the housing, the cleaning device being operably coupled to a drive, the drive being controlled by a controller; driving the cleaning device along the surface of the portable computing device, the driving of the cleaning device along the surface of the computing device including: driving the cleaning device substantially along the entirety of the surface; and retracting the cleaning device back into the cavity, It is to be understood that both the foregoing general description and the following detailed description are exemplary and explanatory only and are not necessarily restrictive of the present disclosure. The accompanying drawings, which are incorporated in and constitute a part of the specification, illustrate subject matter of the disclosure. Together, the descriptions and the drawings serve to explain the principles of the disclosure.

BRIEF DESCRIPTION OF THE DRAWINGS

The numerous advantages of the disclosure may be better understood by those skilled in the art by reference to the accompanying figures in which.

DETAILED DESCRIPTION

Reference will now be made in detail to the subject matter disclosed, which is illustrated in the accompanying drawings.

The current disclosure is directed at an apparatus that may mechanically clean the surfaces of a portable computing device when the device is not in use. One embodiment of the present invention preferably may be used to clean at least the display and keyboard of a portable computing device (e.g., laptop computer, pda, etc.) while the device is open or closed.

Figure 1:
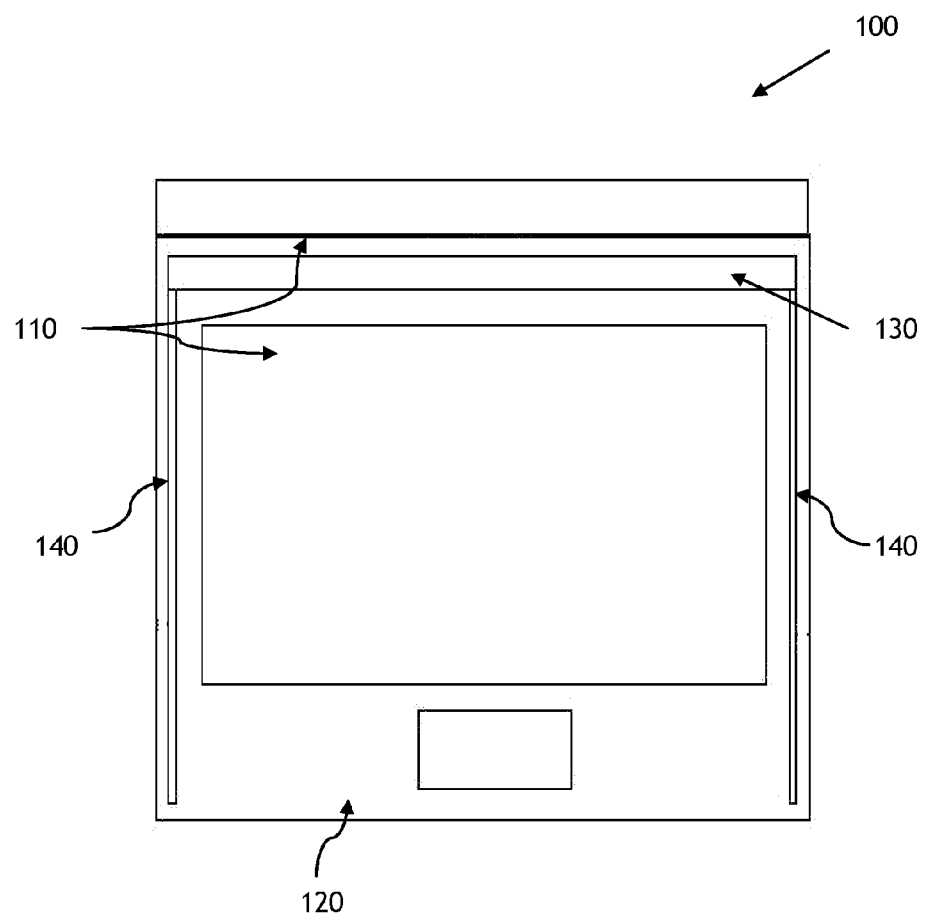
FIG. 1 is a top down view of a preferred embodiment showing a portable computer housing, a door enclosing a cleaning device, and channels for a screw drive to drive the cleaning device.

Referring to FIG. 1, a top down view of a portable computing device 100 is shown. In one embodiment, a portable computing device may include one or more surfaces 110 which may require cleaning (e.g., a display screen and/or a keyboard 110). The portable computing device may include a housing 120 which may contain the internal components of the device. Manufactured into the housing preferably is an enclosed cavity containing a cleaning device protected by a door 130. Preferably, a drive mechanism is enclosed in the housing along the surface to be cleaned which drives the cleaning device either direction over the full length of the surface to be cleaned. The drive mechanism may preferably be of a screw type, enclosed in the housing and operably connected to the cleaning device. The cleaning device may follow channels 140 manufactured into the housing used to guide the cleaning device over all surfaces.

Figure 2:
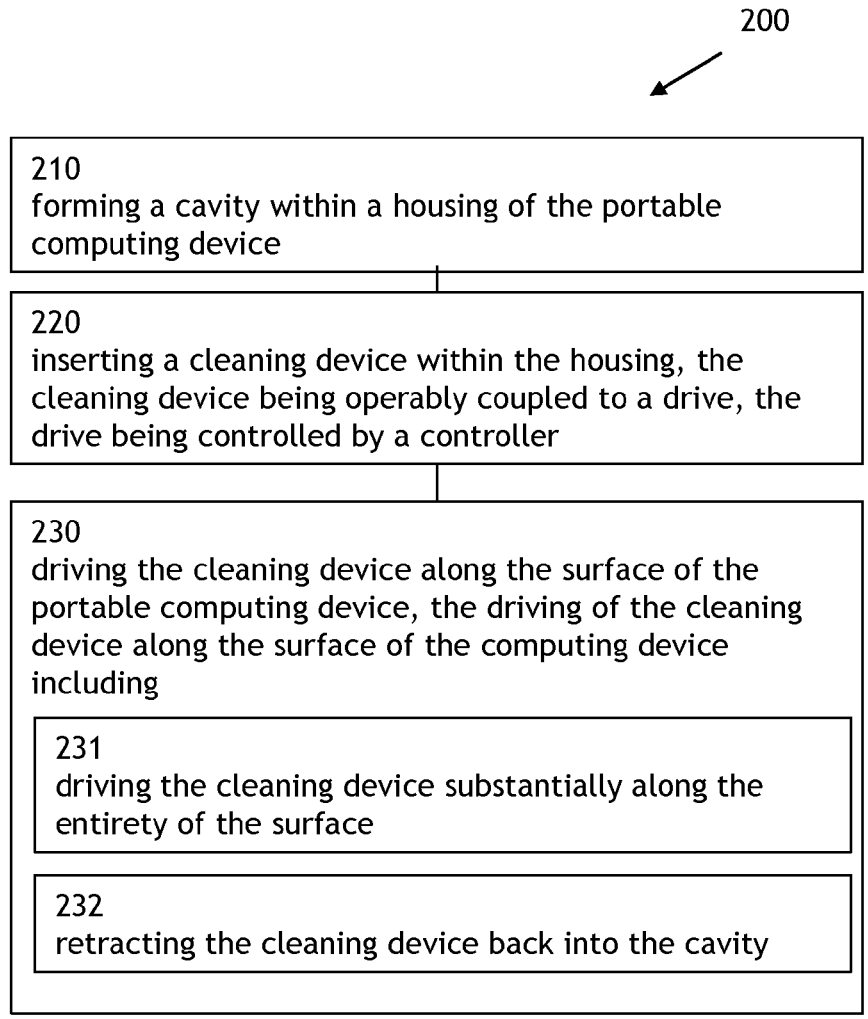
FIG. 2 is a flow chart illustrating a method for cleaning a surface of a portable computing device.

Referring to FIG. 2, a flow diagram illustrating a method 200 for cleaning a portable computing device is shown. Method 200 may form a cavity within a housing of the portable computing device 210. Method 200 may also include inserting a cleaning device within the housing, the cleaning device being operably coupled to a drive, the drive being controlled by a controller 220 (e.g., a screw drive mechanism controlled by a computer). Method 200 further includes driving the cleaning device along the surface of the portable computing device 230. Method 200 may further include driving the cleaning device substantially along the entirety of the surface 231, and retracting the cleaning device back into the cavity 232 (e.g., a two extension/retraction cleaning cycle every time the laptop lid is closed).

Figure 3:
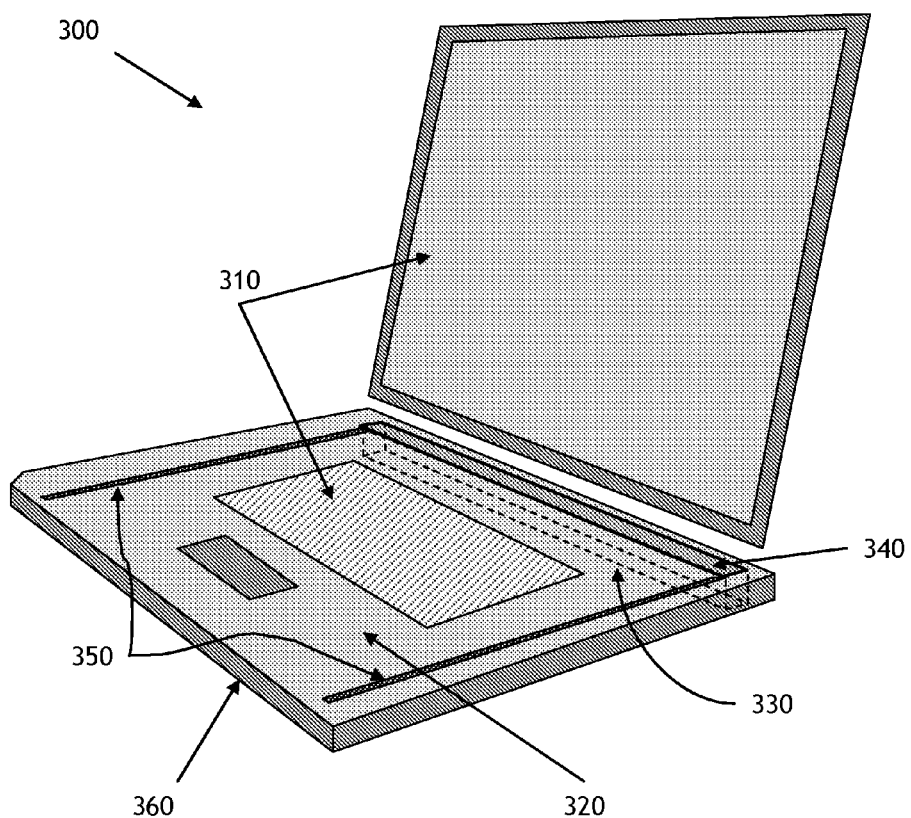
FIG. 3 is an isometric view of the components of a cleaning apparatus installed on a laptop computer.

Referring to FIG. 3, an isometric view 300 of a portable computing device including an apparatus for automatic cleaning of the surfaces of a portable device is shown. The surfaces to be cleaned may include the display screen and the keyboard 310. Preferably, the cleaning device may be installed in the housing 320 of a laptop computer. A cleaning device may be stored in a cavity 330 created in the housing of a portable computing device and protected by a door 340. A drive mechanism 350 may include channels manufactured into the housing of the computing device and may include a mechanism to open the door 340 and move the cleaning device over all surfaces desired to be cleaned. A controller 360 may control the cleaning device.

Preferably, an automatic cleaning may include opening a door, extracting the cleaning device, extending the cleaning device along the entirety of the surface, reversing the direction of the cleaning apparatus, retracting the cleaning apparatus back to the starting position, replacing the cleaning apparatus in the cavity, and closing the door. Preferably, the controller may initiate door opening and partial extraction of the cleaning device for cleaning device removal and cleaning or replacement.

Figure 4:
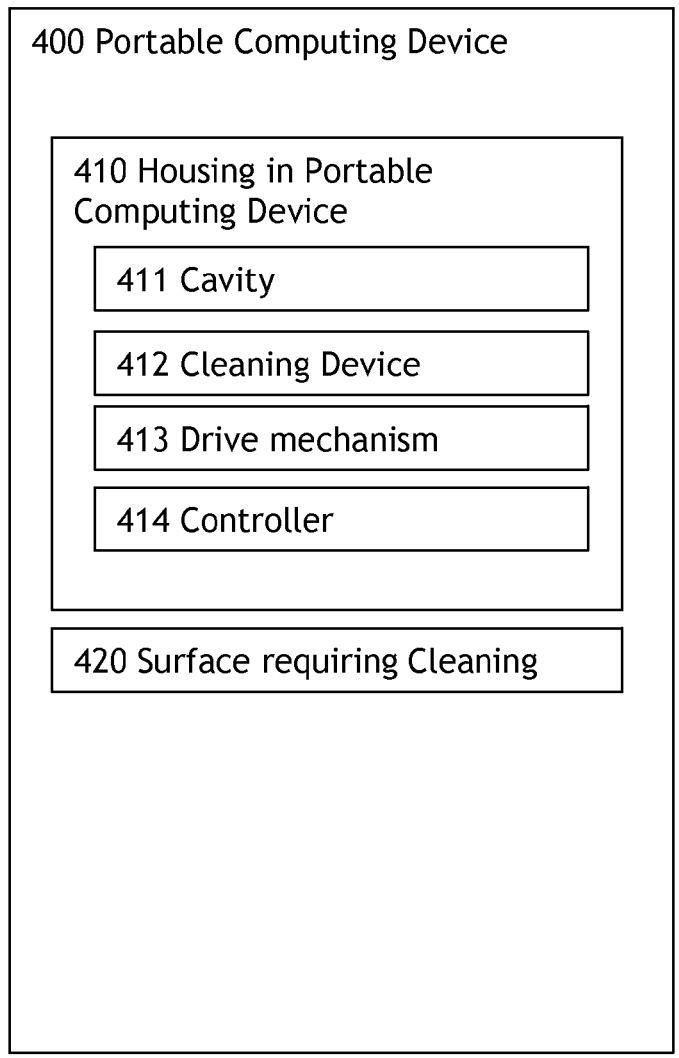
FIG. 4 is a diagram of the components of a cleaning apparatus of a portable computing device.

Referring to FIG. 4, a diagram of the components of a cleaning apparatus is shown. A portable computing device 400 may include a housing 410. Included in the housing may be a cavity 411, a cleaning device 412, a drive 413, and a controller 414. Adjacent to the housing may be a surface of the device requiring cleaning 420.

In a preferred embodiment the cleaning device 412 may include a thin rod having an outer layer formed from a material that may attract dust and debris. The thin rod may be of a shape that is most efficient for cleaning and storage and may flow stationary or rotate about an axis as it travels over the surface to be cleaned. For example, a brush or a roller with dust attracting qualities. The thin rod may be replaceable after its use is complete.

In the present disclosure, the apparatus and method disclosed may be implemented as sets of instructions or software readable by a device. Further, it is understood that the specific order or hierarchy of steps in the methods disclosed are examples of exemplary approaches. Based upon design preferences, it is understood that the specific order or hierarchy of steps in the method can be rearranged while remaining within the disclosed subject matter. The accompanying method claims present elements of the various steps in a sample order, and are not necessarily meant to be limited to the specific order or hierarchy presented.

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes.

What is claimed is:

1. An apparatus for automatic cleaning a portable computing device comprising:
   - a display surface pivotally attached to a housing of said portable computing device;
   - a cavity located in said housing;
   - a cleaning device located in said cavity;
   - a door for enclosing said cleaning device in said cavity;
   - a mechanism for moving said cleaning device during cleaning; and
   - a controller for initiating said cleaning,
   - wherein said cleaning device cleans both said display surface and a keyboard disposed in said housing while said display surface is pivotally closed onto to said housing.

* * * * *